United States Patent [19]
Gilmore

[11] 3,917,220
[45] Nov. 4, 1975

[54] VALVE

[76] Inventor: Samuel E. Gilmore, P.O. Box 265, Bellaire, Tex. 77401

[22] Filed: May 30, 1974

[21] Appl. No.: 474,576

Related U.S. Application Data

[63] Continuation of Ser. No. 255,211, May 22, 1972, abandoned.

[52] U.S. Cl. .......... 251/86; 137/116.3; 137/625.25; 137/625.65; 251/175; 251/176; 251/327; 251/DIG. 1
[51] Int. Cl.² ............... F16K 3/18; F15B 13/044; G05D 16/00
[58] Field of Search....... 137/116.3, 625.25, 625.65; 251/DIG. 1, 77, 84, 85, 86, 87, 129, 175, 176, 178, 206, 195, 196, 326, 327

[56] References Cited
UNITED STATES PATENTS

| | | | |
|---|---|---|---|
| 2,959,189 | 11/1960 | Natho | 137/625.65 |
| 3,294,112 | 12/1966 | Watkins | 251/206 X |
| 3,329,168 | 7/1967 | Vollmer | 251/175 X |
| 3,533,598 | 10/1970 | Tillman | 251/327 |
| 3,601,149 | 8/1971 | Gilmore | 137/625.65 X |
| 3,608,587 | 9/1971 | Zbell | 251/84 X |
| 3,610,574 | 10/1971 | Hartman | 251/176 |
| 3,642,020 | 2/1972 | Payne | 251/175 X |

FOREIGN PATENTS OR APPLICATIONS

| | | | |
|---|---|---|---|
| 583,438 | 1/1925 | France | 251/176 |
| 282,318 | 12/1927 | United Kingdom | 251/327 |
| 903,341 | 8/1962 | United Kingdom | 251/195 |
| 285,221 | 2/1928 | United Kingdom | 251/176 |
| 578,237 | 6/1946 | United Kingdom | 251/176 |

Primary Examiner—Alan Cohan
Assistant Examiner—Gerald A. Michalsky
Attorney, Agent, or Firm—Murray Robinson

[57] ABSTRACT

Shear valve includes a hollow valve body having inlet and outlet flow passages thereto, a flat faced seal plate at the inner end of each flow passage having a port therethrough communicating with the flow passage and a closure comprising stem means reciprocable in the valve body transversely to the flow passage axes, a cage carried by the stem means having a bearing opening extending therethrough, the axis of the bearing opening being generally parallel to the axes of the flow passages, and a pair of seals in the form of flat end faced tubes reciprocably coaxially mounted in the cage in sealing relationship therewith and spring and fluid pressure biased apart into sealing engagement with the flat faces of the seal plates. Improvement according to the invention includes means mounting the cage to be rockable relative to the stem means to allow the seals to lie flat against the seal plates and sealingly engage therewith. Three forms of rockable mounting are disclosed, i.e. double tapered support opening in a spool type stem means, elastomer O-ring mounting cage in support opening of a spool type stem means, and a stem means comprising two coaxial rods rockably engaging diametrically opposed sockets in the cage.

7 Claims, 11 Drawing Figures

VALVE

This is a continuation of application Ser. No. 255,211 filed May 22, 1972, now abandoned.

BACKGROUND OF THE INVENTION

1. Field of Invention.

This invention relates to valves and more particularly to shear or gate type valves for hydraulic systems, especially for use underwater or in other remote locations where inspection, adjustment, and maintenance are difficult so that non-leakage is especially desirable.

2. Description of the Prior Art.

Under water blowout preventer systems with hydraulic controls using sonic, electric, hydraulic, or electro-hydraulic actuated poppet valves have heretofore been employed and are believed to have been patented. Experience showed that such valves cut out after 5 or 10 operations and it was suggested by the system designers that shear valves be employed in place of poppet valves. Shear valves, having flat rather than conical surfaces can be lapped to produce superior flatness, e.g. to a 2 or 3 microfinish, whereby total tightness of the valve can be achieved. It is believed that the use of a shear valve type construction for undersea hydraulic controls, used in either drilling or production of oil wells, such construction employing floating seals, i.e., in which the seal tubes are reciprocably mounted in a cage is being considered.

It is known to use shear valves in hydraulic systems, such valve comprising a hollow valve body having inlet and outlet flow passages thereto, a flat faced seal plate or seat at the inner end of each flow passage having a port therethrough communicating with the flow passage, and a closure comprising stem means reciprocable in the valve body transversely to the flow passage axes, a cage carried by the stem means having a bearing opening extending therethrough, the axis of the bearing opening being generally parallel to the axis of the flow passages, and a pair of seals in the form of flat faced tubes reciprocably coaxially mounted in the cage in sealing relationship therewith and spring and fluid pressure biased apart into sealing engagement with the flat faces of the seal plates. Variations of such structure, including a modification employing a blind seal plate, are shown in my recently issued U.S. Pat. No. 3,601,149, dated Aug. 24, 1971, the disclosure of which is incorporated herein by reference.

Such valves are subject to leakage if for any reason the stem means twists the cage so that the bearing opening thereof supporting the seal tubes is misaligned relative to the seal plates. In the case of high pressure hydraulic fluid, e.g. 3000 pounds per square inch, leakage would cause rapid cut out of the valve seals and/or seal plates with attendant failure of the valve.

In the case of a pressure regulator valve, twisting of the spool type stem means may occur due to adjustment of the pressure of the helical compression spring that bears against the end of the spool.

Similarly, in a solenoid or fluid actuated, spring return valve, there is a certain amount of torque created in the coils of a helical spring when it is compressed and such torque tends to twist the spool when the valve opens or closes. Even in a valve that is power actuated in both directions, electrically or hydraulically, there is a certain amount of play in the spool due to manufacturing tolerances and the need to insure that the stem means does not bind or freeze up, and because of such play the spool may twist.

The primary object of the present invention is the elimination of valve leakage in a shear type valves, and after discovering a cause of leakage being misalignment of the seal cage due to twisting of the spool, it became an object of the invention to eliminate such misalignment. After the invention, set forth hereinafter, was made, the present inventor was informed that a certain valve structure having some similarity to the present invention was already in existence, such structure employing a lost motion connection between the spool and cage to provide for impact to assist an electric actuator, but so far as is known this is actually a diffferent structure for a different purpose than that of the present invention.

SUMMARY OF THE INVENTION

According to the invention the cage carrying the seal tubes is rockably mounted relative to the stem means which moves the cage between open and closed positions. In one embodiment this is effected by providing a spool type stem means with a double flared opening which engages the cage essentially in line contact, the line being a circle defined by the intersection of the two outwardly flaring parts of the opening, whereby the cage can rock about any diameter of the circle as may be required to bring the flat end faces of the seal tubes carried by the cage into parallelism with the flat faces of the seal plates (seats) despite twisting of the spool about its axis. In another embodiment of the invention a spool type stem means has a generally cylindrical opening of larger diameter than the generally cylindrical exterior of the cage and the cage is resiliently supported in the opening by an O-ring around the cage fitting coaxially in the spool opening midway between the ends thereof. In a third embodiment, the stem means comprises not a spool but instead a pair of aligned rods extending through opposite sides of the valve body into sockets in the cage at diametrically opposite sides thereof, the sockets being enough larger than the ends of the rods, e.g. with flaring mouths, to allow the cage to rock relative to the rods.

The aforementioned three types of rockable mounting means will be exemplified as same may be employed in a solenoid actuated, spring return, three-way valve, a pressure regulating valve, and a mechanically actuated four way valve, and a mechanically actuated four way valve, but it is to be understood that any of the three types of rockable mounting means disclosed can be used in conjunction with any of the three types of shear valves disclosed and also in other types of valves.

In the ensuing description, the parts are to be understood as being made of hard metal such as steel, preferably stainless steel, except that the seal rings may be made of any suitable sealing material but are preferably made of an elastomer such as neoprene or natural rubber. The elastomer ring forming part of the resilient rockable mounting of the second described embodiment is preferably made of natural or synthetic rubber resistant to the ambient medium, e.g., neoprene, and preferably has a durometer hardness on the Shore A scale in the range of 50 to 90.

In combination with a shear valve, wherein the seat surfaces of the seal plates and the end faces of the seal tubes are ground to a super smooth and flat finish, e.g. a 2 or 3 microfinish and a flatness of less than 7 microinches, and the seal tubes are hydraulically and spring biased toward the seal plates, rockable mounting of the cage carrying the seal tubes, allowing the latter to remain absolutely flat against the seal plates despite rocking of the stem means in which the cage is mounted, effects a perfect seal.

With reference to a 2 or 3 microfinish, same is to be understood as measured on a profilometer, as described on page 293 of Machinery's Handbook, 15th Edition, 1956, published by the Industrial Press, 98 Worth Street, New York, 13 N.Y. The FIGS. 2 or 3 refer to microinches. The finish of the subject seat surfaces of the seal plates and end surfaces of the seal tubes may be in the range of about 2 to 5 microinches as measured on a profilometer. With reference to the degree of flatness, same may be measured with an interferometer using monochromatic light source as measured through an optical flat placed on top of the surface to be measured. With respect to the surface areas involved, FIGS. 1, 2, 5, 7, and 8 of the annexed drawings are full scale. The subject finish and flatness may be called an optical finish.

BRIEF DESCRIPTION OF THE DRAWINGS

For a detailed description of preferred embodiments of the invention reference will now be made to the accompanying drawings wherein.

DESCRIPTION OF PREFERRED EMBODIMENTS

Figures 1, 2:
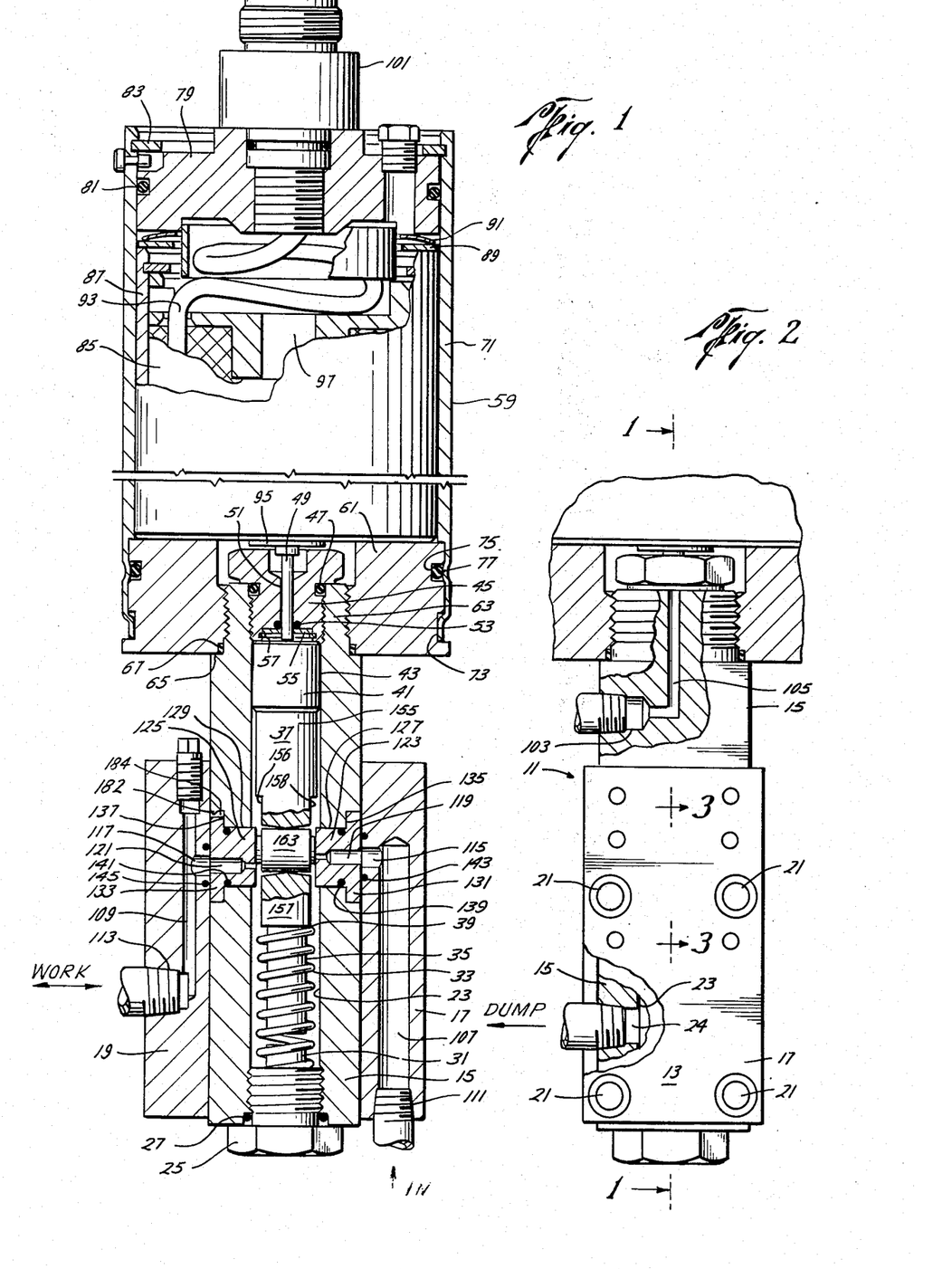
FIG. 1 is a vertical section through a three way valve in accordance with a first embodiment of the invention, the section being taken at plane 1—1 of FIG. 2.
FIG. 2 is an elevation, partly in section, of the valve shown in FIG. 1.

Referring now to FIGS. 1 and 2 there is shown a valve 11 comprising a fabricated stainless steel body 13 including a rectangular horizontal cross section core 15 and side cover plates 17 and 19. The cover plates are secured to the core by screws 21. There is a cylindrical bore 23 in the body core 15. A dump port 24 in the side of the core is threaded to adapt it for connection to a hydraulic fluid reservoir or tank, whereby the space inside core 23 is at tank pressure except where sealed off therefrom.

The lower end of bore 23 is closed fluid tight by screw plug 25 and O-ring seal 27. There is a cylindrical centering pin 31 on the inner end of plug 25 receiving one end of helical return compression spring 33. The other end of spring 33 is disposed around cylindrical centering pin 35 on the lower end of spool 37, bearing against downwardly facing shoulder 39 thereof.

The upper end of spool 37 is provided with a cylindrical slide portion 41 which slides axially in the bearing 43 formed by the upper end of bore 23.

The upper end of bore 23 is closed by a screw plug 45 and O-ring seal 47. An actuating pin 49 is axially slidably mounted in an axial bore 51 in plug 45 and is sealed thereto by O-ring seal 53. The latter is held in place by washer 55 and snap ring 57.

An electromagnetic actuator for forcing pin 49 includes a screw connection base 61 screwed on to the threaded pin 63 formed at the upper end of valve body core 15. The base 61 shoulders against the core 15 at 65 with an O-ring seal 67 captured between the base 61 and the neck of pin 63.

The actuator includes a thin resilient housing 71 telescoped at its lower end over base 61 and rolled into grooves 73, 75 around the base. An O-ring seal 77 in groove 75 is thereby pressurized into sealing relation with the base and housing. The upper end of housing 71 is closed by a floating cylindrical disc 79 sealed to the housing by O-ring seal 81. The disc is retained in housing 71 by snap ring 83.

Inside housing 71 between base 61 and disc 79 is disposed electric solenoid 85, the outer casing 87 of which fits closely within housing 71 and rests at its bottom on base 61. A washer 89 rests on the upper end of casing 87, and wave spring 91 takes up the play between disc 79 and washer 89 without preventing downward movement of the disc when the actuator is under high external pressure.

Inside casing 87 is helical coil of wire wound on spool 97 which when energized moves a magnetic slug (not shown) downwardly within the coil pushing rod 95 downwardly against actuator pin 49 to move spool 37 down against the force of compression spring 33. Deenergization of the coil allows return spring 33 to move spool 37 back up again.

To supply electricity to the coil there is provided a lead in cable 93 which emerges from the actuator 59 through sealed lead-in fitting 101. Cable 93 may be a single or two conductor cable depending upon whether or not the coil has a ground return, but is normally a two conductor cable.

The interior of housing 71 is filled with oil to prevent collapse under external pressure. The solenoid 85 heats when coil 93 is energized and this in turn heats the oil, but the floating closure disc can move back up toward stop ring 89 to prevent pressure build up inside the housing. The thin housing 71 can itself expand and contract a certain amount to accomodate to changes of internal and external temperature and depth of operation in the sea.

If desired, the solenoid internal pressure can be further controlled by external means, e.g. a pressure compensating or relief valve (not shown) connected to threaded socket 103 (FIG. 2) in the side of core 15. The socket communicates through passage 105 with the upper end of pin 63 outside the area covered by screw plug 45 where it is exposed to the space inside solenoid housing 71. If no external control means is used, socket 103 will be closed with a screw plug.

The side plates 17, 19 of the valve body are provided with flow passages 107 (inlet) and 109 (work). The flow passages have sockets 111, 113 at their outer ends adapted for connection with hydraulic lines, socket 111 to be connected to a high pressure line and socket 113 to be connected to a device to be actuated. The inner ends of passages 107, 109 connect to ports 115, 117 communicating with passages 119, 121 in seal plates (seats) 123, 125. The seal plates are flat end surfaced plugs set in cylindrical openings 127, 129 in core 15 of the valve body, flanges 131, 133 on the plugs being captured between shoulders 135, 137 in passages 127, 129 and plates 17 and 19.

Figures 3, 4:
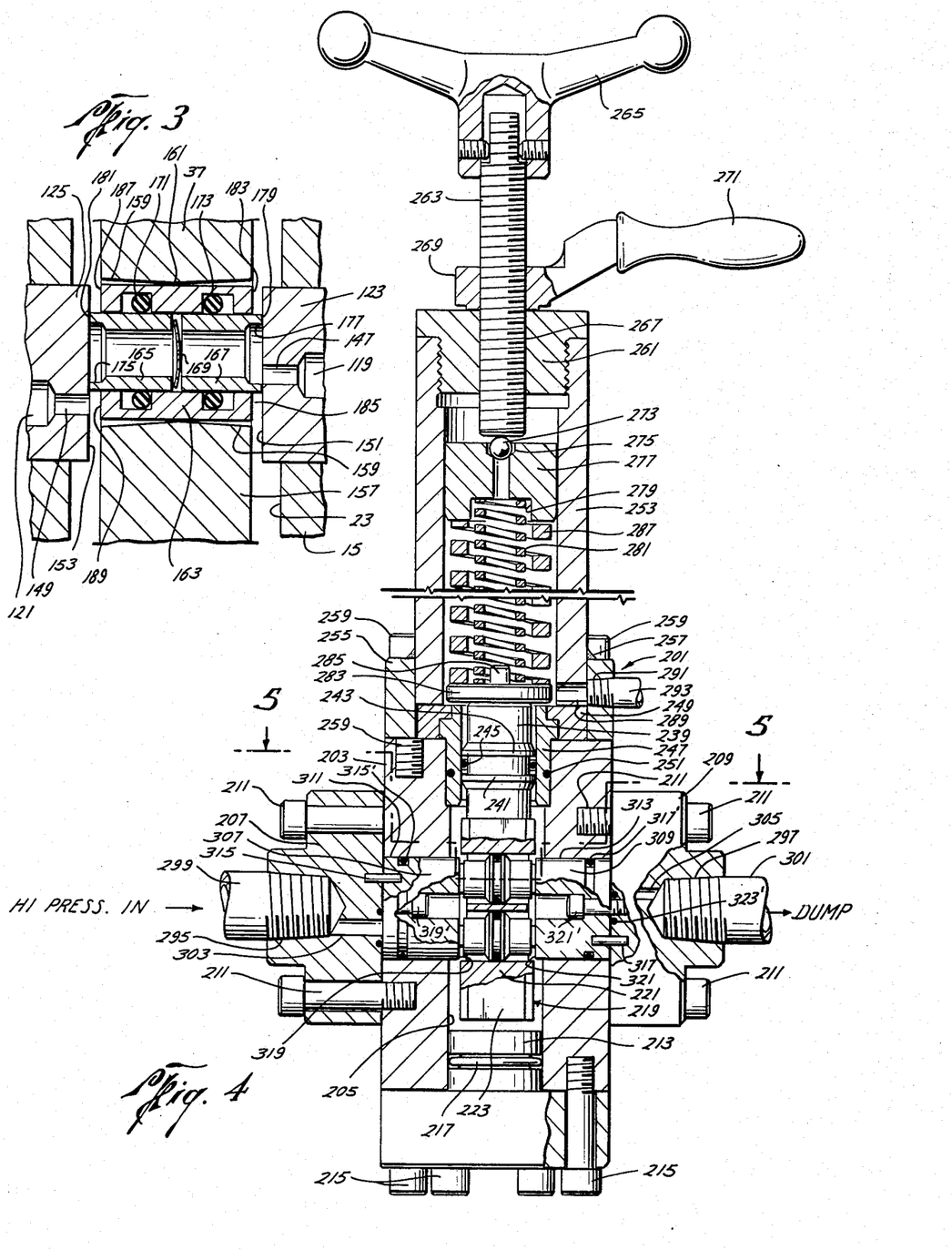
FIG. 3 is an enlargement of a portion of FIG. 1 showing the cage mounting, the portion being indicated at 3—3 of FIG. 2.
FIG. 4 is a vertical section through a pressure regulator valve in accordance with a second embodiment of the invention.

Referring now also to FIG. 3, O-ring seals 139, 141 seal the plugs to the core. O-ring seals 143, 145 seal the plates to the plugs around ports 117, 115. The ports 147, 149 at the inner ends of passages 119, 121 are of reduced diameter, compared to passages 119, 121. Ports 147, 149 communicate with the interior bore 23 of the core 15, the flat surfaces 151, 153 (see FIG. 3) of the plugs or seal plates around the ports 147, 149 forming flat valve seats.

The root portion 155 of spool 37 just below slide 41 is cylindrical but of smaller diameter than the slide 41. Between root portion 155 and centering pin 35 the spool 37 has a flat sided gate portion 157. The two flat sides 156, 158 are disposed between the inner flat seat faces 151, 153 of seal plates 123, 125, but spaced slightly therefrom so that the gate can move up and down freely therebetween. As best shown in FIG. 1, between the flat sides 156, 158, the gate portion 157 has the same diameter as the spool 37 so as to guide the spool within bore 23. There is a circular cross section opening 159 through spool 37. The axis of opening 159 is substantially perpendicular to the parallel flat inner faces or seat surface 151, 153 of seal plates 123, 125. According to the invention, the opening 159 flares, e.g. conically from its smallest diameter portion or support girth 161 midway of the ends of the opening towards the outer ends of the opening.

Rockably mounted in the opening 159 in essentially line contact with girth 161 is a tubular cylindrical cage 163. The flares of gate opening 159 at each side of girth 161 permit the cage to rock about any diameter of the girth. As soon as the cage rocks so that its axis is is no longer coaxial with that of passage 159, i.e. no longer perpendicular to the plane of circular girth 161, the contact between the cage and girth is reduced essentially to two points of contact at the ends of the girth diameter relative to which diameter the cage rocks.

Axially slidably mounted in tubular cage 163 coaxial with the inner periphery thereof are two seal tubes 165, 167. Between the flat inner end faces of the tubes is a wave spring 169 which gently urges the tubes outwardly toward seal plates 123, 125. O-ring seals 171, 173 seal the seal tubes to the inner periphery of cage 163, the seals being disposed in annular grooves in the cage. The outer ends of seal tubes 165, 167 are internally bored out to produce annular lips 175, 177 whose outermost flat ends 179, 181 bear against seat surfaces 151, 153 of the seal plates, in metal to metal sealing engagement therewith. Although the fluid pressure in the area between lip ends 179, 181 and seat faces 151, 153 is unknown, it is at least less than that in between the opposite ends of the tubes adjacent spring 169 so that hydraulic or other fluid pressure in this space urges the seal tubes into engagement with the seat surfaces of the seal plates.

The inlet port 147 and the work port 149 are at different levels, the inlet port 147 being centered in seal plate 123 whereas work port 149 is in the lower part of seal plate 125. Alignment pin 182 in groove 184 in seal plate 125 positions the latter azimuthally to properly locate work port 149. As shown in the drawings the valve is in its deenergized or off position in which the spool and cage and seal tubes are elevated as far as they will go by spring 33, the slide 41 stopping against the bottom of screw plug 45. In this position inlet port 147 is closed by seal tube 167, the cage 163, seal tube 165, and seal plate 125, while work port 149 is open to bore 23 inside valve body core 15. When the solenoid 59 is energized the spool 35 and cage 163 and seal tubes 165, 167 are moved down placing inlet port 147 in communication with work port 149 through seal tubes 165, 167 and cage 163. This is the energized or on position of the valve.

It is to be noted that the construction employing the two seal tubes and cage provides gate means which is easy to move, only the slight hydraulic pressure differential over the area of the ends 179, 181 of the seal tube lips acting to create friction between the gate means and the seal plate seats.

Should spool 37 twist about its axis or tilt relative to the vertical axis of the valve, i.e. the axis or bore 23, it will not cause the cage 163 and seal tubes 165, 167 to be cocked, the mounting of the cage 163 in gate portion 161 of the spool allowing the cage axis and the seal tube axes to remain perpendicular to the seats 151, 153. Otherwise expressed, the rockable mounting of the cage 163 in the gate portion of the spool enables the flat end faces 179, 181 of the seal tube lips to remain in contact with the flat seat faces 151, 153 of the seal plates despite angular displacement of the spool. This prevents leakage which would cut out the seal tube lips with resultant valve failure.

Figure 5:
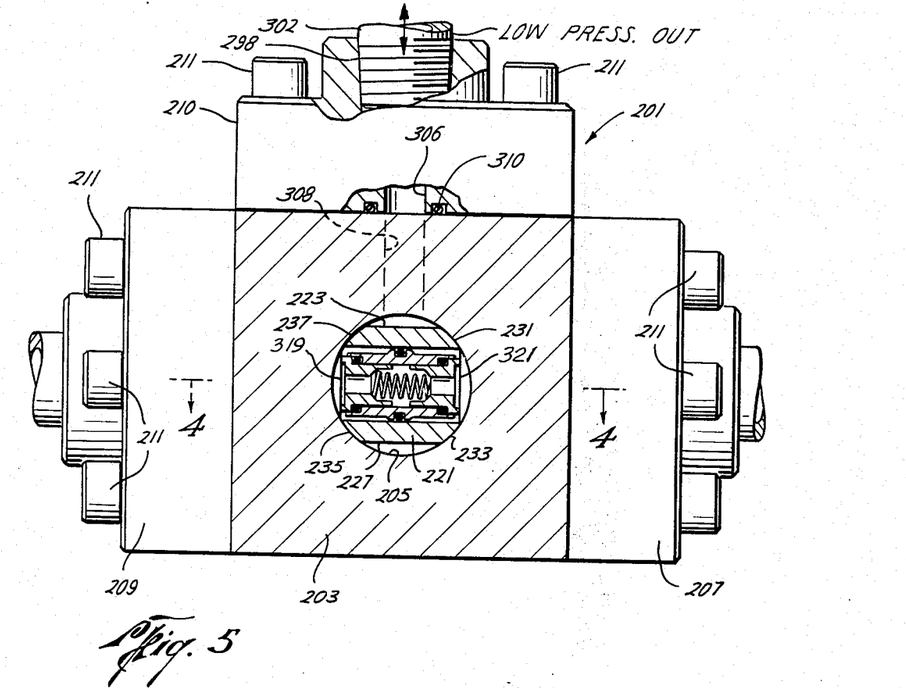
FIG. 5 is a section taken along planes 5—5 of FIG. 4.

Referring now to FIGS. 4 and 5 there is shown a pressure regulating valve 201 comprising a valve body including a rectangular external horizontal cross-section core 203, having a cylindrical bore 205, and side plates 207, 209 and front plate 210 secured to the core by screws 211. The lower end of bore 205 is closed by a plug 213 secured to the core by screws 215 and sealed thereto by O-ring 217.

Axially slidably mounted in bore 205 is a generally cylindrical spool 219. The lower or gate portion 221 of the spool has four flat sides 223, 225, 227, 229. The round corners 231, 233, 235, 237 left between the flat sides of the gate portion fit within the bore 205 to engage therewith and be guided thereby.

The upper portion or root 239 of the spool is of a smaller diameter than bore 205 and is provided with a pair of annular flanges 241, 243 between which is disposed on O-ring seal 245. The upper end of bore 205 is closed by a bushing 247 clamped to the core by ring 249 and sealed thereto by O-ring seal 251. The flanges 241, 243 on spool root 239 slide within the bearing provided by bushing 247, and O-ring 245 seals thereto.

Surmounting clamp ring 249 is a tubular spring housing 253. A base ring 255 is welded at 257 to the lower end of housing 253 and secured to core 203 by four screws such as the two shown at 259. By this means the clamp ring 249 is secured to core 203.

The upper end of spring housing 253 is closed by screw plug 261. A spring compression adjustment screw 263, having a handle 265 secured thereto, extends through threaded hole 267 in plug 261. A lock nut 269 on screw 263 is tightened and released by means of handle 271.

The lower end of spring adjustment screw 263 bears against ball bearing 273 set in socket 275 in the top of spring support piston 277. The piston 277 fits slidably inside spring housing 253. The lower end of piston 277 has a socket 279 receiving the upper end of helical coil compression spring 281. The lower end of spring 281 rests on spring support disc 283. Disc 283 is centrally operated and is spindled on pin 285 screwed into or integral with spool 219, the disc resting on the upper end of spool root 239. Pin 285 may be a screw fastening disc 283 to spool root 239. Pin 285 centers spring 281 on disc 283. Another helical coil compression spring 287 coaxial with and surrounding spring 281 bears at its lower end against disc 283 and at its upper end against piston 277.

There is a bleed port 289 in the lower part of spring housing 253, the port 289 communicating with the outside of the valve or other medium through threaded passage 291 in ring 255 into which a pipe 293 may be screwed.

The side plates 207, 209 and front plate 210 of the valve body are provided with threaded sockets 295, 297, 298 into which are screwed inlet, dump, and outlet pipes 299, 301, 302. Socket 295 communicates with port 303. Socket 297 communicates with port 305. Socket 298 communicates with port 306. Port 303 is in the lower part of plate 207 and is thus below port 305 which is in the upper part of plate 209. Port 306 is colevel with the axes of sockets 295, 297, 298 and communicates through flow passage 308 with core bore 205, plate 210 being sealed to core 203 by O-ring 310 around port 306.

Cylindrical seal plates 307, 309 are received in bores 311, 313 in core 203. The seal plates are azimuthally positioned by means of alignment pins 315, 317 extending from the body plates 207, 209. The seal plates are secured to the side plates by screws such as 319', 321', which are sealed by O-ring seals such as 323'. The seal plates are sealed to bores 311, 313 by O-ring seals 315', 317'. The inner ends of seal plates 207, 209 are flat providing seats 319, 321.

Figure 6:
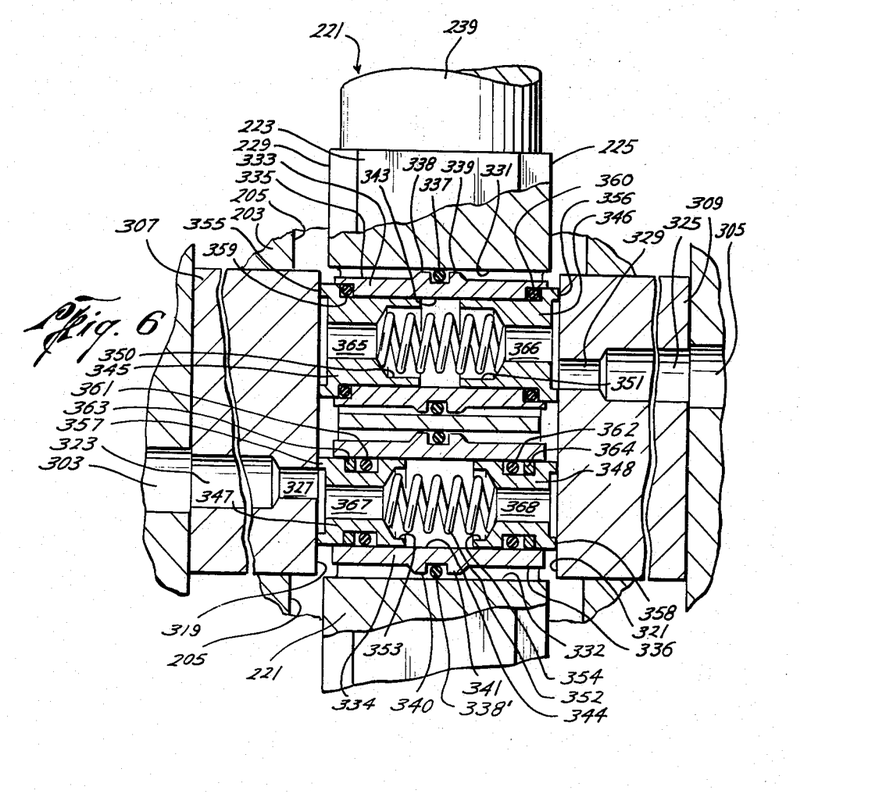
FIG. 6 is a fragmentary section to an enlarged scale taken along plane 4—4 of FIG. 5.

Referring now to FIG. 6, flow passages 323, 325 in the seal plates communicate at their outer ends with ports 303, 305 in the body plates and at their inner ends with inlet and dump ports 327, 329 in seats 319, 321.

The gate portion 221 of the spool is of a width such that it can move up and down between seats 319, 321. The gate has two cylindrical openings 331, 332 therethrough in each of which are disposed tubular cages 333, 334, each having generally cylindrical outer periphery as shown at 335, 336. O-rings 337, 338' around the cages, 333, 334, respectively, resiliently, rockably mount the cages in gate openings 331, 332. The O-rings 337, 338' are retained on cages 333, 334 by a pair of annular flanges 338, 339 and 340, 341. Flanges 338, 339, 340, 341, do not contact gate 221 so that the cages 333, 334 are free to rock relative to the axis of gate openings 331, 332. Also, the spaces between flanges 338–339 and between flanges 340–341 are wider than the diameters of O-rings 337, 338', not only to allow room for the latter to deform when the cages are placed inside gate openings 331, 332, but to enable the O-rings to roll slightly as the cages rock thereon.

The cages 333, 334 have cylindrical internal bores 343, 344 within which are axially slidably mounted seal tubes 345, 346, 347, 348. The seal tubes 345, 346 are biased outwardly by a helical spring, the ends of which are received in sockets 350, 351 in the inner ends of the tubes. Similarly, seal tubes 347, 348 are biased outwardly by helical spring 352, the ends of which are received in sockets 353, 354 in the inner ends of the tubes. The outer ends of the tubes are provided with annular lips 355, 356, 357, 358 having flat outer ends making sealing engagement with the seal plate seat surfaces 319, 321.

The lips 355, 356 have inner diameters substantially as large as the outer diameters of the tubes 345, 346, whereby, as set forth in my aforementioned United States Patent, the tubes are substantially balanced with respect to fluid pressure. O-ring seals 359, 360 seal the outer peripheries of tubes 345, 346 to the cage 333 and are under slight compression axially of the tubes between the backs of lips 355, 356 and the rabbets in the ends of the cage 333.

The lips 357, 358 have outer diameters of the same size as the outer diameters of the tubes 347, 348 so that the tubes are biased hydraulically outwardly the same as the seal tubes of the FIGS. 1-3 embodiment of the invention heretofore described. The seal tubes 347, 348 are sealed at their outer peripheries to cage 334 by O-ring seals 361, 362 which are protected against extrusion under high pressure by metal back-up snap rings 363, 364.

The valve 201 is shown in a neutral position in which both the inlet port 327 and the outlet port 329 are closed. The tubes 345, 346, though provided with internal fluid passages 365, 366 communicating with the bore 343 of cage 333, merely conduct fluid pressure to seat 319 of seal plate 307 which, together with the cage 333 and seal tubes 345, 346 closes bleed port 329. Similarly, the tubes 347, 348, though provided with internal fluid passages 367, 368 communicating with the bore 344 of cage 334, merely conduct fluid presssure to seat 321 of seal plate 309 which, together with the cage 334 and seal tubes 347, 348, closes inlet port 327.

When the pressure in bore 205 of the valve body core 203 falls below the preselected set pressure e.g., due to a fall in pressure at outlet pipe 302 communicated through port 306 and passage 308, the springs 281, 287 move spool 221 downwardly until lip 357 passes over inlet port 327 far enough to admit high pressure fluid to bore 205 of the valve body core. During such motion lip 356 remains around dump port 329 which stays closed. When the pressure in bore 205 rises back to the set pressure, the spool 221 moves back up to close inlet port 327. If the pressure in the bore 205 rises above the set pressure for any reason, e.g., a rise in pressure in outlet pipe 302, the spool 219 moves upwardly against the spring pressure far enough to move lip 356 across dump port 329 sufficiently to communicate the core 205 to dump port 329. Meanwhile the lip 357 remains around inlet port 327 and inlet port remains closed. When the fluid in bore 205 bleeds off through dump port 329 sufficiently to lower the pressure in the bore back to the set pressure, the spool 221 moves back down to the neutral position closing off dump port 329.

Due to the resilient rockable mounting of the cages 333, 334 in the gate portion of spool 221, twisting or rocking of the spool, e.g. due to readjustment of the compression of springs 281, 287, does not cause the seal tubes 345, 346, 347, 348 to move out of sealing engagement with seats 319, 321.

It should also be noted that the spool itself is allowed a certain amount of movement to prevent it from binding in its guide bearings, especially within bushing 247, the root of the spool being of smaller diameter than the bushing and out of contact with the bushing except over the areas of the narrow flanges 241, 243. This also allows the spool to realign itself in the event that it is moved out of alignment.

Referring now to FIGS. 7–11 there is shown another embodiment of the invention in four way valve 375. Valve 375 comprises a body including a general rectangular core 377 and rectangular top and bottom plates 379, 381 secured thereto by screws such as 383. The core has a cylindrical bore 385. Seal plates 387, 389 are disposed in the upper and lower ends of bore 385, the plates having shoulders on their outer peripheries which overlie outwardly facing shoulders in bore 385 with O-ring seals 391, 393 sealing therebetween. Top and bottom plates 377, 381 hold the seal plates to the core.

There is left a pill box shaped space 395 inside core 377 between the flat seat faces 397, 399 of seal plates 387, 389. Disposed in space 395 is ring shaped cage 401 having a cylindrical inner periphery in which seal tubes 403, 405 are axially slidably mounted and sealed thereto by O-ring seals around the outer peripheries of the seal tubes. Annular lips 407, 409 at the outer ends of the seal tubes have flat ends sealingly engaging the seats 397, 399. The seal tubes are urged apart toward the seats by a wave spring 411. They are also urged toward the seats by fluid pressure the same as the seal tubes of the valve shown in FIGS. 1–3.

Figures 7, 8, 9, 10, 11:
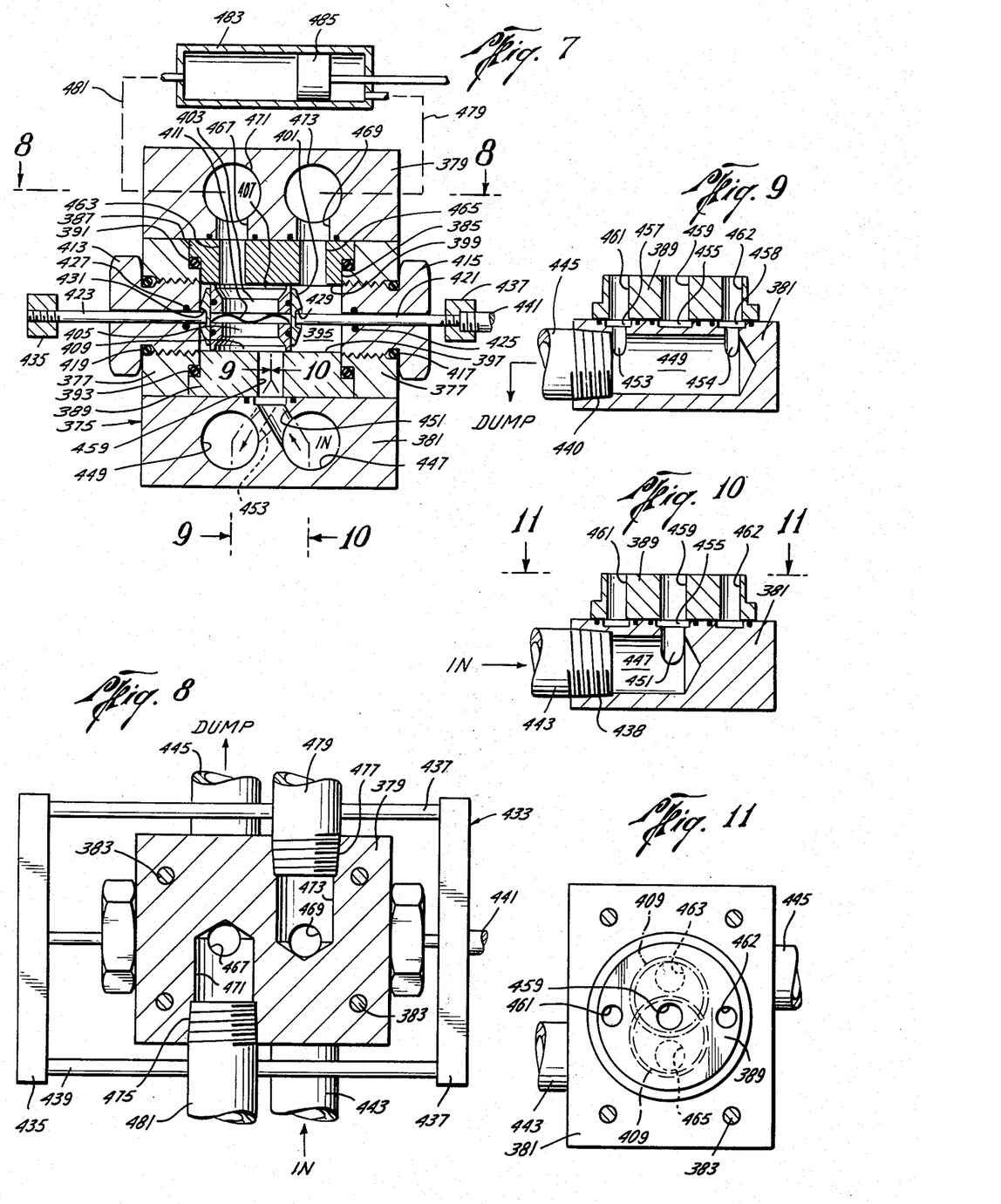
FIG. 7 is a vertical section through a four-way valve in accordance with a third embodiment of the invention.
FIG. 8 is a section taken at plane 8—8 of FIG. 7.
FIGS. 9 and 10 are sections taken at planes 9—9 and 10—10 of FIG. 7.
FIG. 11 is a view taken at 11—11 of FIG. 10.

There are two bearing plugs 413, 415 screwed into the sides of block 377 and sealed thereto by O-ring seals 417, 419. Axially slidably disposed in bearing bores in these plugs are valve stem rods 421, 423, which are sealed thereto by O-ring seals 425, 427. The inner ends of the rods are received in diametrically opposed sockets 429, 431 in the mid portion of cage 401. The mouths of the sockets 429, 431 are larger in diameter than the ends of stems 421, 423 received therein, the sockets flaring from their bottoms to their mouths, whereby the rods accurately position the mid point or center of the cage but the cage is rockably mounted on the rods and assumes a position placing the flat ends of the lips of the seal tubes flat against the flat seats 397, 399. The outer periphery of the cage 401 is bevelled or tapered from its mid portion to its ends so that when it engages either of plugs 413, 415 the latter will not interfere with rocking motion of the cage.

The cage is moved back and forth from one side of bore 385 to the other by axial movement of the stems 421, 423, the latter being connected to rectangular yoke 433 for that purpose. The yoke also keeps the stems in position in sockets 429, 431 in the cage. The yoke includes end bars 435, 437, into which the outer ends of the stems are screwed, and side rods 437', 439' also screwed at their ends into bars 435, 437. A drive rod 441 is also screwed into bar 437 for actuating the yoke to move the stems back and forth.

The bottom plate 381 of the valve body has threaded sockets 438, 440 therein into which are screwed inlet and dump pipes 443, 445. The sockets communicate with flow passages 447, 449 in plate 381 which passages in turn communicate with passages 451, 453, 454 in the plate, the latter terminating in ports 455, 457, 458 in the top face of plate 381. The ports 455, 457, 458 are each surrounded by an O-ring seal to seal therearound between bottom plate 381 and seal plate 389. The seal plate 389 is provided with inlet port 459 and dump ports 461, 462 communicating with ports 455, 457, 458 in the bottom plate. As best shown in FIG. 11, dump ports 461, 462 are always open to the interior space 395 and inlet port 459 is always sealed off from space 395 by seal tube 405, the extreme positions of lip 409 of which are shown in broken lines.

Depending upon the position of cage 401, lip 409 is positioned to communicate inlet port 459 with one or the other of work ports 463, 465 in seal plate 387, the remaining work port being outside lip 409 in communication with dump ports 461, 462. Work ports 463, 465 communicate with ports 467, 469 in top plate 379, there being O-ring seals in the top plate around ports 467, 469 to seal the top plate to the seat plate. Ports 467, 469 communicate with flow passages 471, 473 and the latter communicate with threaded sockets 475, 477 into which are screwed work pipes 479, 481. As shown schematically in FIG. 7, work pipes 479, 481 may be connected to opposite ends of a hydraulic cylinder 483 for moving a piston 485 therein to actuate a mechanism or device.

From the foregoing it will be apparent that depending on the position of yoke 433, the valve 375 will be positioned to connect one or the other of the work ports to the inlet port and thereby allow high pressure fluid to be conveyed to the external hydraulic cylinder or other means to be operated, the remaining work port being connected to the dump ports whereby the opposite side of the hydraulic cylinder is relieved of pressure.

In all three embodiments of the invention, as above described, there is provided a cage which is rockably mounted in a stem means, spool or rod type, whereby the ends of the seal tubes carried by the cage can lie flat against the seat plates without interference by the stem means. Such mounting could be called a floating mounting, the number of degrees of freedom of the cage mounting varying somewhat in the several embodiments but in all cases enabling the cage to rock about whatever diameter is necessary for it to position the seal tube ends flat against the seal plates.

While preferred embodiments of the invention have been shown and described, modifications thereof can be made by one skilled in the art without departure from the spirit of the invention.

I claim:

1. Shear valve comprising a hollow valve body having flow ports thereto and including a pair of oppositely inwardly facing seal plates having parallel flat seat faces, at least one of said plates having one of said ports therein with the seat face extending around the port, a cage mounted in said body for movement parallel to said faces, said cage having a generally cylindrical opening therethrough providing a bearing whose axis is perpendicular to said seat faces, two open ended seal tubes telescopically disposed in said bearing and slidingly sealed thereto, said tubes being biased outwardly toward said seat faces, said seal tubes having flat end faces both of which simultaneously are coplanar with their adjacent seat faces to simultaneously sealingly engage said seats, stem means for translating said cage parallel to to said seats, and means rockably mounting said cage relative to said stem means allowing both of said seal tubes simultaneously to remain in seating engagment with said seat faces when said stem means rocks relative to said cage about an axis that is not perpendicular to said seat faces, said cage being free of external constraints that would prevent it from rocking relative to said body to move said flat end faces of said tubes from position not coplanar with said flat seat faces to positon that is coplanar with said flat seat faces, said seal tubes being free of constraints other than those imposed by said cage and seal plates whereby said seal tubes can both simultaneously and independently move into seating engagement with the adjacent seal plates while remaining sealed to the cage.

2. Shear valve according to claim 1 wherein said mounting means includes a portion of said stem means having an opening therethrough and a portion of said cage disposed in said opening, said stem means portion being spaced from said cage portion, and resilient means disposed between said portions, said resilient means comprising an elastomeric ring disposed around an outer periphery of said cage received within said opening in said stem means, said seal tubes being sealed by seal rings to the inner periphery of said bearing provided by the opening in the cage.

3. Shear valve according to claim 2 wherein said cage portion includes annular flanges at either side of said elastomeric ring for positioning same, said flanges being spaced apart a greater distance than the thickness of said elastomeric ring which is in compression between said cage and stem means portions.

4. Shear valve according to claim 1 wherein said mounting means includes a portion of said stem means having an opening therethrough and a portion of said cage disposed in said opening, said stem means portion engaging said cage portion in a girth circle with space between said portions at either side of said girth circle, said seal tubes being sealed within said cage bearing by elastomeric rings.

5. Shear valve according to claim 1 wherein said mounting means includes flat bottomed socket means in said cage rockably receiving rod ends forming a portion of said stem means, said rod ends having flat end faces, said sockets being diametrically opposite and said rod ends being coaxial, said sockets flaring from their bottoms to their mouths and their bottoms fitting closely enough to said end faces of the rod ends to position the cage.

6. Shear valve according to claim 5 wherein said cage tapers down towards its ends on its exterior at either side of said sockets, and including bearing plugs in said body, said rod ends being the ends of coaxial rods extending through bearing openings in said plugs.

7. Shear valve according to claim 1, comprising a plurality of tubular cages each having a pair of open ended seal tubes axially slidably sealingly mounted therein for making simultaneous engagement at their outer ends with the adjacent seats, each of said cages being rockably mounted in the stem means as specified in claim 1.

* * * * *

UNITED STATES PATENT AND TRADEMARK OFFICE
CERTIFICATE OF CORRECTION

PATENT NO. : 3,917,220
DATED : November 4, 1975
INVENTOR(S) : Samuel E. Gilmore

It is certified that error appears in the above-identified patent and that said Letters Patent are hereby corrected as shown below:

Column 6, line 19, change "or" to --of--.

Column 2, line 4, change "valves" to --valve--.

Column 2, lines 47 and 48, cancel "and a mechanically actuated four way valve,".

Column 5, line 29, change "surface" to --surfaces--.

Column 5, line 38, cancel "is" (second occurrence).

Column 10, line 56, cancel "to" (second occurrence).

Signed and Sealed this fifteenth Day of June 1976

[SEAL]

Attest:

RUTH C. MASON
Attesting Officer

C. MARSHALL DANN
Commissioner of Patents and Trademarks